US012626982B2

(12) United States Patent
Park et al.

(10) Patent No.: US 12,626,982 B2
(45) Date of Patent: May 12, 2026

(54) BATTERY MODULE, BATTERY PACK INCLUDING THE SAME AND MANUFACTURING METHOD OF THE SAME

(71) Applicant: LG Energy Solution, Ltd., Seoul (KR)

(72) Inventors: Won Kyoung Park, Daejeon (KR); Junyeob Seong, Daejeon (KR); Subin Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 786 days.

(21) Appl. No.: 17/796,354

(22) PCT Filed: Jul. 1, 2021

(86) PCT No.: PCT/KR2021/008380
§ 371 (c)(1),
(2) Date: Jul. 29, 2022

(87) PCT Pub. No.: WO2022/005233
PCT Pub. Date: Jan. 6, 2022

(65) Prior Publication Data
US 2023/0069153 A1 Mar. 2, 2023

(30) Foreign Application Priority Data
Jul. 2, 2020 (KR) ........................ 10-2020-0081308

(51) Int. Cl.
*H01M 50/204* (2021.01)
*H01M 10/48* (2006.01)
(Continued)

(52) U.S. Cl.
CPC ....... *H01M 50/204* (2021.01); *H01M 10/482* (2013.01); *H01M 10/653* (2015.04);
(Continued)

(58) Field of Classification Search
CPC ............. H01M 50/204; H01M 50/249; H01M 50/591; H01M 50/244
See application file for complete search history.

(56) References Cited

U.S. PATENT DOCUMENTS

2008/0220324 A1 9/2008 Phillips et al.
2013/0078487 A1 3/2013 Shin et al.
(Continued)

FOREIGN PATENT DOCUMENTS

CN 102804447 A 11/2012
CN 103890994 A 6/2014
(Continued)

OTHER PUBLICATIONS

International Search Report for PCT/KR2021/008380 dated Oct. 8, 2021. 3 pgs.

*Primary Examiner* — Olatunji A Godo
(74) *Attorney, Agent, or Firm* — Lerner David LLP

(57) ABSTRACT

A battery module according to one embodiment of the present disclosure includes a battery cell stack in which a plurality of battery cells including electrode leads are stacked; an insulating cover that covers the front surface and rear surface of the battery cell stack in which the electrode leads protrude; and a sensing assembly located between the battery cell stack and the insulating cover. The sensing assembly is mounted on the inside surface of the insulating cover and connected to the electrode lead.

13 Claims, 14 Drawing Sheets

(51) Int. Cl.
    *H01M 10/653*     (2014.01)
    *H01M 50/244*     (2021.01)
    *H01M 50/249*     (2021.01)
    *H01M 50/505*     (2021.01)
    *H01M 50/591*     (2021.01)

(52) U.S. Cl.
    CPC ....... *H01M 50/244* (2021.01); *H01M 50/249* (2021.01); *H01M 50/505* (2021.01); *H01M 50/591* (2021.01); *H01M 2220/20* (2013.01)

(56)            References Cited

U.S. PATENT DOCUMENTS

| | | | |
|---|---|---|---|
| 2014/0220420 A1 | 8/2014 | Yoshioka et al. | |
| 2015/0037647 A1* | 2/2015 | Nguyen ............ | H01M 10/6555 |
| | | | 429/120 |
| 2015/0132631 A1 | 5/2015 | Lee et al. | |
| 2015/0349390 A1* | 12/2015 | Aiba ................... | H01M 50/264 |
| | | | 429/90 |
| 2016/0268652 A1 | 9/2016 | Eom et al. | |
| 2017/0365888 A1* | 12/2017 | Kwon .............. | H01M 10/4207 |
| 2018/0048033 A1 | 2/2018 | Lee et al. | |
| 2019/0189979 A1 | 6/2019 | Choi et al. | |
| 2019/0389318 A1* | 12/2019 | Lee ..................... | H01M 50/516 |
| 2019/0393574 A1 | 12/2019 | Goeb et al. | |
| 2020/0020904 A1 | 1/2020 | Takatsuji | |
| 2021/0043981 A1 | 2/2021 | Fukuoka et al. | |
| 2021/0126314 A1* | 4/2021 | Masuda .............. | H01M 50/298 |

FOREIGN PATENT DOCUMENTS

| | | | |
|---|---|---|---|
| CN | 205194770 | U | 4/2016 |
| CN | 107431160 | A | 12/2017 |
| CN | 109346630 | A | 2/2019 |
| CN | 109546028 | A | 3/2019 |
| CN | 210296462 | U | 4/2020 |
| JP | 2006172994 | A | 6/2006 |
| JP | 2013033635 | A | 2/2013 |
| JP | 2013-089488 | A | 5/2013 |
| JP | 2018-010843 | A | 1/2018 |
| JP | 2018060595 | A | 4/2018 |
| JP | 2018513528 | A | 5/2018 |
| JP | 6680881 | B2 | 4/2020 |
| KR | 20140130357 | A | 11/2014 |
| KR | 20150054289 | A | 5/2015 |
| KR | 20160026469 | A | 3/2016 |
| KR | 20160094909 | A | 8/2016 |
| KR | 20160122887 | A | 10/2016 |
| KR | 20170043928 | A | 4/2017 |
| KR | 20180080811 | A | 7/2018 |
| KR | 102009443 | B1 | 8/2019 |
| KR | 20190103380 | A | 9/2019 |
| KR | 20190134229 | A | 12/2019 |
| WO | 2019-003664 | A1 | 1/2019 |
| WO | 2019-187043 | A1 | 10/2019 |

* cited by examiner

BATTERY MODULE, BATTERY PACK INCLUDING THE SAME AND MANUFACTURING METHOD OF THE SAME

CROSS-REFERENCE TO RELATED APPLICATIONS

The present application is a national phase entry under 35 U.S.C. § 371 of International Application No. PCT/KR2021/ 008380, filed on Jul. 1, 2021, which claims priority from Korean Patent Application No. 10-2020-0081308 filed on Jul. 2, 2020 with the Korean Intellectual Property Office, the disclosures of which are incorporated herein by reference.

TECHNICAL FIELD

The present disclosure relates to a battery module, a battery pack including the same and a method of manufacturing the same, and more particularly, to a battery module capable of simplifying the manufacturing process and reducing the weight of parts, a battery pack including the same and a method of manufacturing the same.

BACKGROUND

In modern society, as portable devices such as a mobile phone, a notebook computer, a camcorder and a digital camera are used daily, the development of technologies in the fields related to mobile devices as described above has increased. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, there is a growing need for development of the secondary battery.

Currently commercialized secondary batteries include a nickel cadmium battery, a nickel hydrogen battery, a nickel zinc battery, a lithium secondary battery, and the like. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate each coated with the positive electrode active material and the negative electrode active material are disposed with a separator being interposed between them, and a battery case that seals and houses the electrode assembly together with an electrolyte solution.

Generally, the lithium secondary battery may be classified based on the shape of the exterior material into a can-type secondary battery in which the electrode assembly is mounted in a metal can, and a pouch-type secondary battery in which the electrode assembly is mounted in a pouch made of an aluminum laminate sheet.

In the case of a secondary battery used for small-sized devices, two to three battery cells are disposed, but in the case of a secondary battery used for a middle or large-sized device such as an automobile, a battery module in which a large number of battery cells are electrically connected is used. In such a battery module, a large number of battery cells are connected to each other in series or in parallel to form a cell stack, thereby improving capacity and output. In addition, one or more battery modules may be mounted together with various control and protection systems such as BDU (battery disconnect unit), BMS (battery management system) and a cooling system to form a battery pack.

FIG. 1 is an exploded perspective view of a conventional battery module.

Referring to FIG. 1, a conventional battery module 10 is formed by housing a battery cell stack 20 in a module frame 30 and an end plate 40.

The battery cell stack 20 is formed by stacking a plurality of battery cells along one direction, whereby the electrode lead 21 may protrude in a direction perpendicular to the direction in which the battery cells are stacked.

The module frame 30 may be made of a material having a predetermined strength in order to protect the battery cell stack 20 from external impact and the like, and may be structurally formed by coupling an upper frame 31 and a lower frame 32.

The end plate 40 may be located in the protruding direction of the electrode lead 21 with respect to the battery cell stack 20, and a busbar frame 50 may be located between the battery cell stack 20 and the end plate 40.

FIG. 2 is an enlarged perspective view of the busbar frame 50 and the end plate 40 included in the battery module of FIG. 1, and FIG. 3 is a partial view showing a section "A" of FIG. 2 in an enlarged manner. At this time, for convenience of explanation, FIG. 3 shows a state in which electrode lead 21 of the battery cells is included.

Referring to FIGS. 1 to 3, the busbar 51 may be mounted on the busbar frame 50. The busbar 51 is to electrically connect between a plurality of battery cells, and the electrode lead 21 of the battery cells is bent after passing through a slit formed in the busbar frame 50, so that it can be connected to the busbar 51. In the connection between the electrode lead 21 and the busbar 51, the method is not limited as long as an electrical connection is possible, and the connection can be made by welding as an example. In this manner, the battery cell stack to which the battery cells are electrically connected via the busbar 51 may be connected to another battery module, a BDU (battery disconnect unit), or the like via a terminal busbar or the like exposed to the outside. That is, the conventional battery module 10 electrically connects the battery cells via the busbar 51, and the battery module 10 electrically connects with other battery modules via a terminal busbar or the like, thereby capable of realizing high voltage (HV) connection. Here, the HV connection is a connection that serves as a power source for supplying power, and refers to a connection between battery cells or a connection between battery modules.

On the other hand, in order to prevent ignition or explosion of the battery module 10, it is necessary to measure the voltage information and the temperature information of the battery cells and transmit them to a BMS (battery management system). The conventional battery module 10 includes a low voltage (LV) sensing assembly 60 and can transmit the voltage information of the battery cells to the BMS. Specifically, the LV sensing assembly 60 is connected to the busbar 51 to measure the voltage of each battery cell, and the measured value can be transmitted to an external BMS via a connector. That is, the conventional battery module 10 transmits the voltage information via the busbar 51 and the LV sensing assembly 60, thereby capable of realizing a LV (low voltage) connection. Here, the LV connection means a sensing connection for sensing and controlling the voltage of the battery cell.

Taken together, the conventional battery module 10 joins the electrode leads 21 of each battery cell to the busbar 51 stacked to realize a HV connection, and in order to realize the LV connection, the LV sensing assembly 60 may be connected to the busbar 51 to which the electrode lead 21 has been joined. In addition, the busbar frame 50 may be formed to mount such a busbar 51.

DETAILED DESCRIPTION OF THE INVENTION

Technical Problem

It is an object of the present disclosure to provide a battery module that can simplify the manufacturing process and reduce the weight of parts by improving the conventional HV connection structure and LV connection structure, a battery pack including the same and a method of manufacturing the same.

However, the problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a battery cell stack in which a plurality of battery cells including electrode leads are stacked; an insulating cover that covers the front surface and rear surface of the battery cell stack in which the electrode leads protrude; and a sensing assembly located between the battery cell stack and the insulating cover, wherein the sensing assembly is mounted on the inside surface of the insulating cover and connected to the electrode lead.

The inside surface of the insulating cover may face the electrode lead, and may be formed with a mounting part that is indented so as to mount the sensing assembly.

The sensing assembly may include a connector and a connection member for connecting the connector and the electrode lead.

The sensing assembly may include a joining member located at one end of the connection member and joined to the electrode lead.

The insulating cover may include at least one opening part, and the opening part may be formed at a position corresponding to a section where the joining member is joined to the electrode lead.

The insulating cover may include a cover part for covering the opening part, and the cover part may form an opening/closing structure with respect to the opening part.

A connector opening part for guiding an external connection of the connector may be formed in the insulating cover.

The battery module may further include a terminal busbar connected to at least one of the electrode leads, and a terminal busbar opening part for guiding an external connection of the terminal busbar may be formed in the insulating cover.

At least two of the electrode leads may be bent and joined to form an electrode lead joint body, and the sensing assembly may be connected to the electrode lead joint body.

According to another embodiment of the present disclosure, there is provided a battery pack comprising: the battery module, a pack frame for housing the battery module, and a thermal conductive resin layer located between the battery module and the bottom part of the pack frame.

According to yet another embodiment of the present disclosure, there is provided a method of manufacturing a battery module, comprising the steps of: stacking a plurality of battery cells to form a battery cell stack; joining electrode leads protruding from at least two adjacent battery cells among the battery cells to form an electrode lead joint body; and locating an insulating cover mounted with a sensing assembly on the front surface and rear surface of the battery cell stack. The sensing assembly is mounted on the inside surface of the insulating cover, and the sensing assembly faces the electrode lead joint body in the step of locating the insulating cover.

The sensing assembly may include a connector, a connection member for connecting the connector and the electrode lead, and a joining member located at one end of the connection member, and the method of manufacturing a battery module may further include joining the joining member and the electrode lead via an opening part formed in the insulating cover.

The insulating cover may include a cover part that forms an opening/closing structure with respect to the opening part.

The step of forming a battery cell stack may include a step of applying an adhesive between adjacent battery cells to attach the adjacent battery cells to each other, and a step of bending the electrode leads of each of the adjacent battery cells and joining them to each other.

Before the step of locating an insulating cover, a step of wrapping the upper surface, the lower surface and both side surfaces of the battery cell stack with a holding band may be performed.

Advantageous Effects

According to embodiments of the present disclosure, it is possible to simplify the manufacturing process and reduce the weight of parts through the insulating cover that integrates the functions of the conventional busbars, busbar frames, and end plates.

The effects of the present disclosure are not limited to the effects mentioned above and additional other effects not described above will be clearly understood from the description of the appended claims by those skilled in the art.

DETAILED DESCRIPTION OF THE EMBODIMENTS

Figure 1:
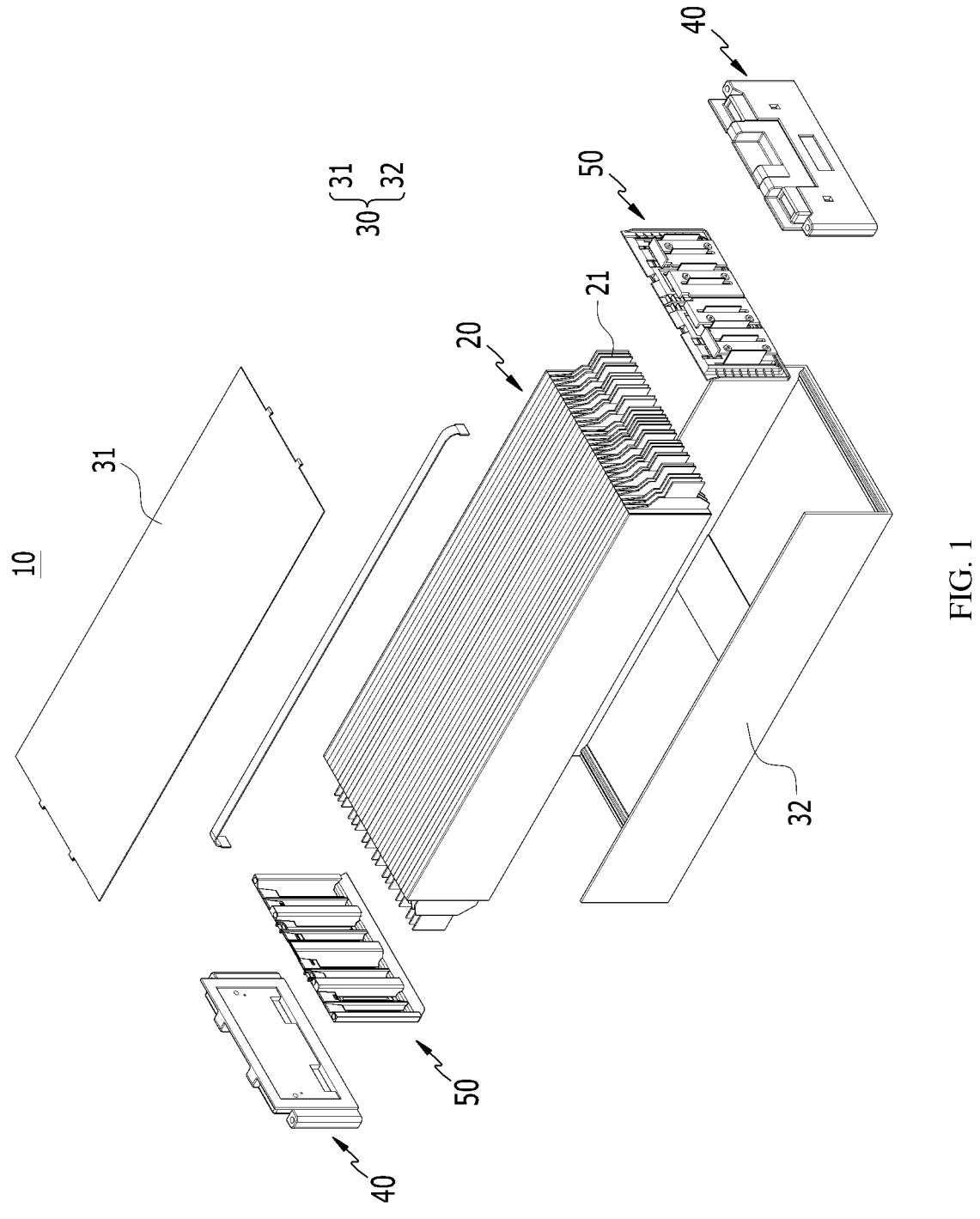
FIG. 1 is an exploded perspective view of a conventional battery module.

Hereinafter, various embodiments of the present disclosure will be described in detail with reference to the accompanying drawings so that those skilled in the art can easily carry them out. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Figure 4:
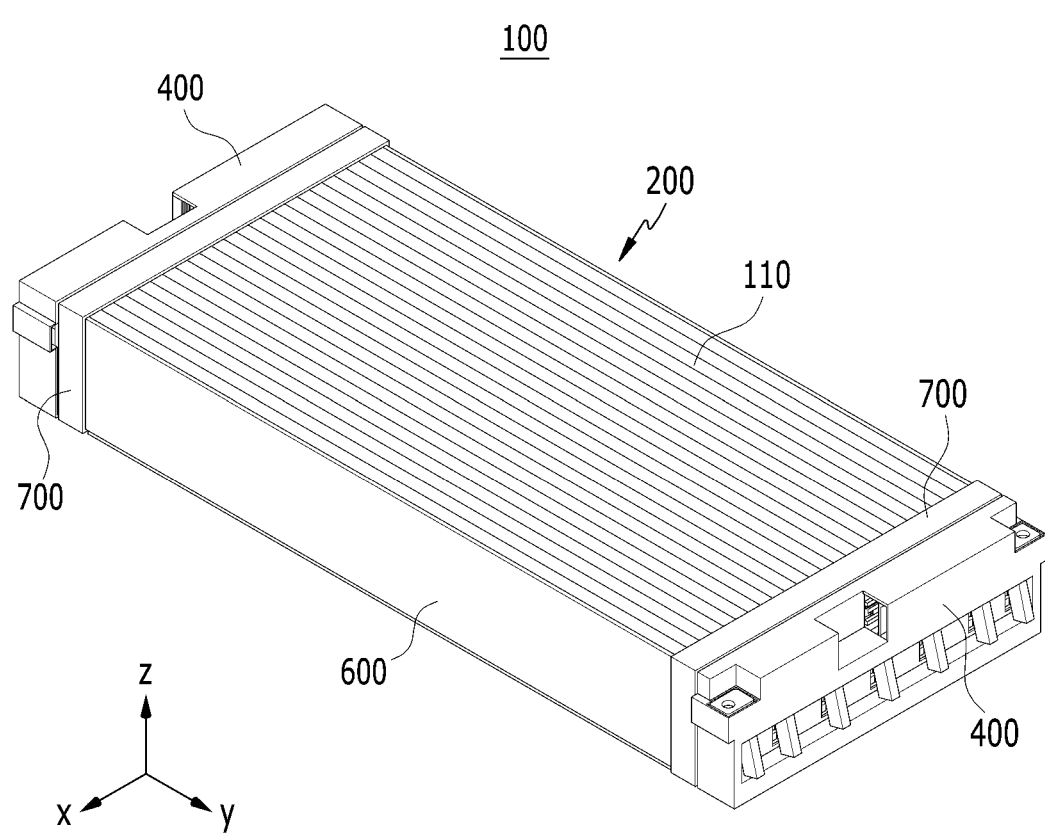
FIG. 4 is a perspective view of a battery module according to an embodiment of the present disclosure.
Figure 5:
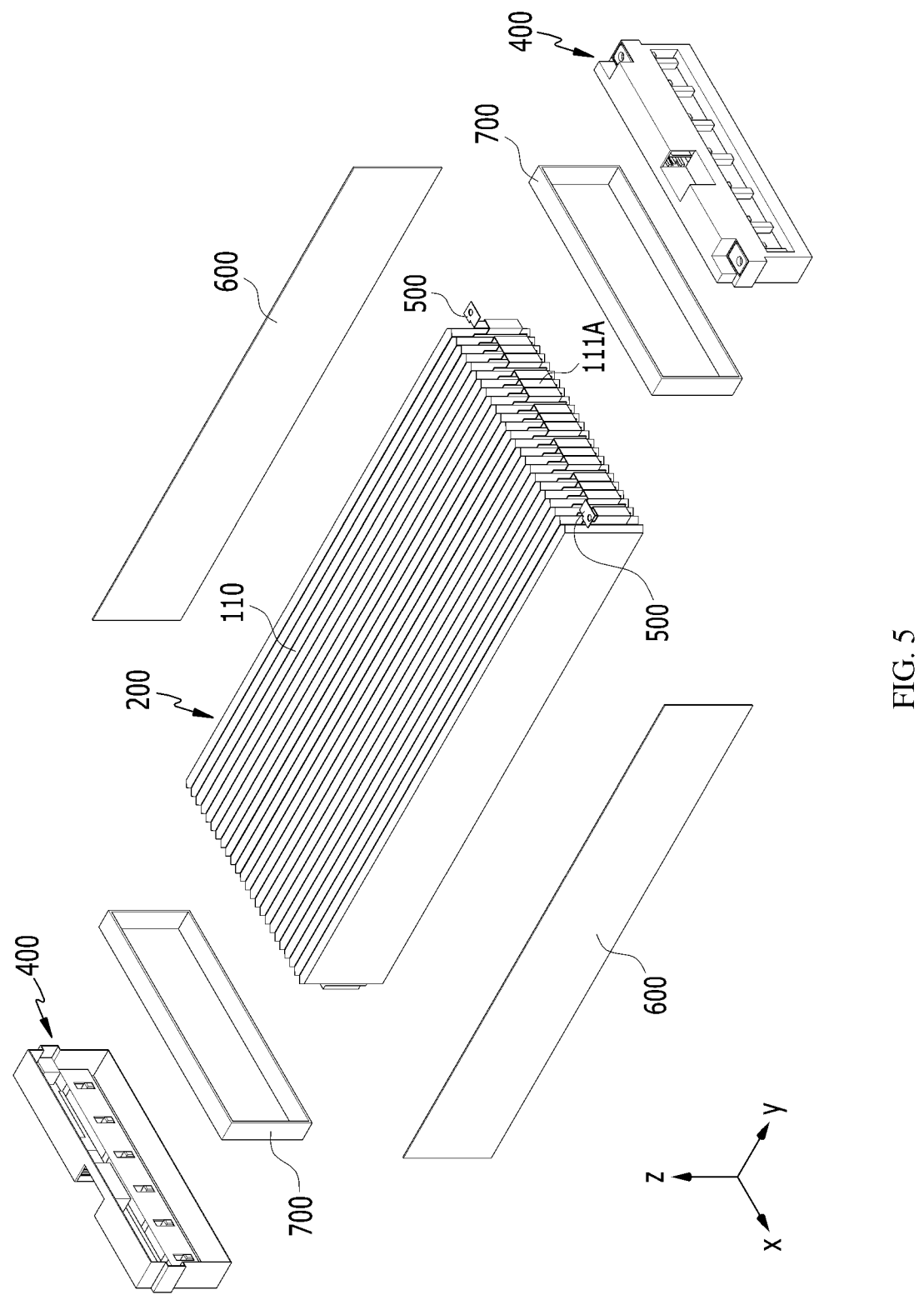
FIG. 5 is an exploded perspective view of the battery module of FIG. 4.
Figure 6:
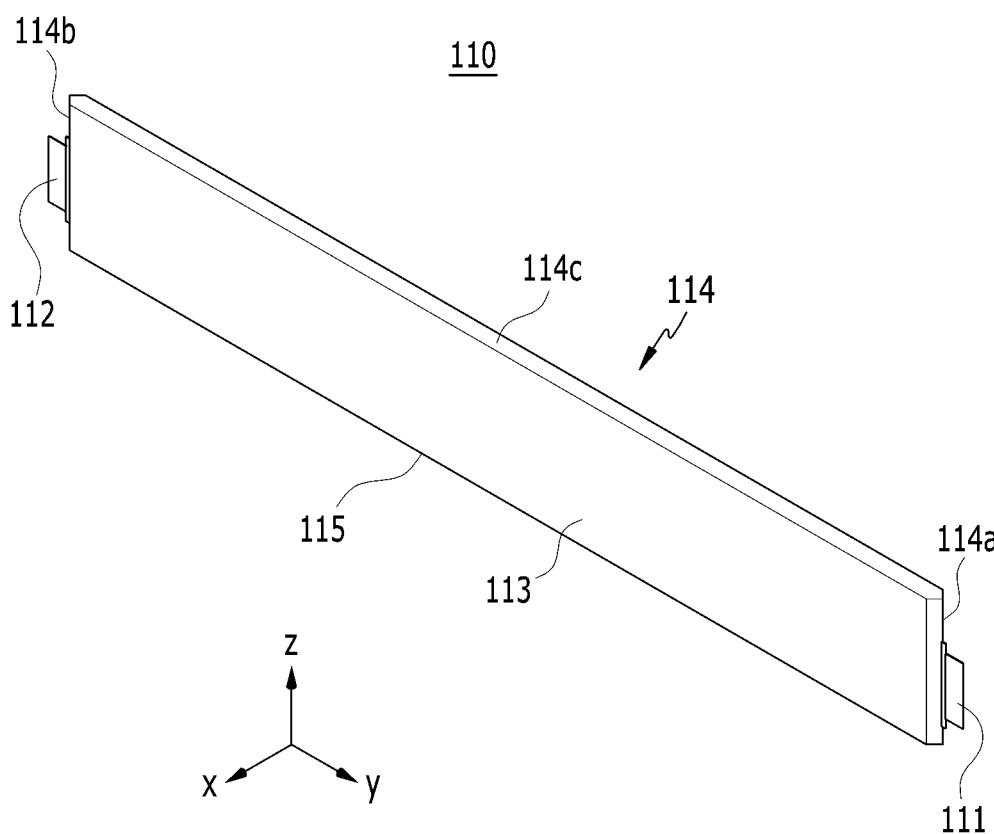
FIG. 6 is a perspective view of a battery cell included in the battery module of FIG. 4.

FIG. 4 is a perspective view of a battery module according to an embodiment of the present disclosure. FIG. 5 is an exploded perspective view of the battery module of FIG. 4. FIG. 6 is a perspective view of a battery cell included in the battery module of FIG. 4.

Referring to FIGS. 4 to 6, a battery module 100 according to an embodiment of the present disclosure includes a battery cell stack 200 in which a plurality of battery cells 110 including electrode leads 11 and 112 are stacked, an insulating cover 400 that covers the front surface and rear surface of the battery cell stack 200 in which the electrode leads 111 and 112 protrude, and a sensing assembly located between the battery cell stack 200 and the insulating cover 400.

First, the battery cell 110 is preferably a pouch-type battery cell, and may be formed in a rectangular sheet-like structure. For example, the battery cell 110 according to the present embodiment has a structure in which the two electrode leads 111 and 112 face each other with respect to the cell body 113 and protrude from one end 114*a* and the other end 114*b*, respectively. More specifically, the electrode leads 111 and 112 are connected to an electrode assembly (not shown) and protrude from the electrode assembly (not shown) to the outside of the battery cell 110. One of the two electrode leads 111 and 112 may be a positive electrode lead 111 and the other may be a negative electrode lead 112. That is, the positive electrode lead 111 and the negative electrode lead 112 can be protruded in a direction facing each other with reference to one battery cell 110.

Meanwhile, the battery cell 110 can be manufactured by joining both ends 114*a* and 114*b* of a cell case 114 and both end parts 114*a* and 114*b*, one side part 114*c* connecting them in a state in which an electrode assembly (not shown) is housed in a cell case 114. In other words, the battery cells 110 according to the present embodiment have a total of three sealing parts, the sealing part has a structure in which it is sealed by a method such as heat fusion, and the remaining other one side part can be composed of a connection part 115. The cell case 114 can be composed of a laminate sheet including a resin layer and a metal layer.

The battery cell 110 may be composed by a plurality of numbers, and the plurality of battery cells 110 may be stacked so as to be electrically connected to each other, thereby forming a battery cell stack 120. Particularly, as shown in FIG. 5, a plurality of battery cells 110 may be stacked along a direction parallel to the x-axis. Thereby, the electrode leads 111 and 112 may protrude in the y-axis direction and the −y-axis direction, respectively.

Figure 2:
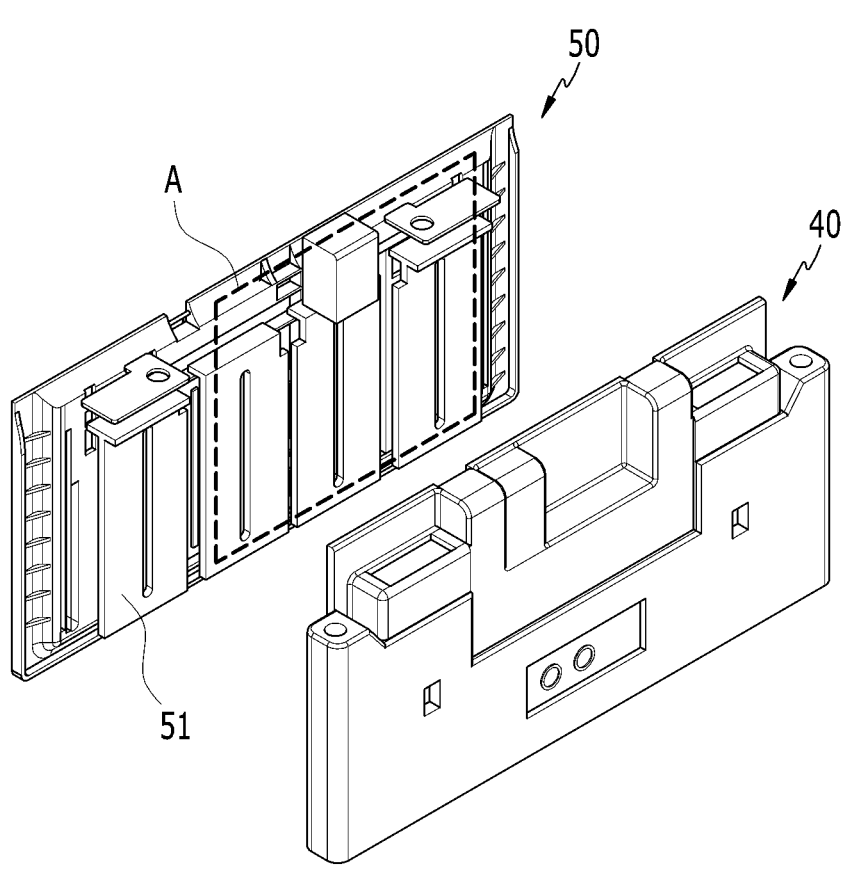
FIG. 2 is an enlarged perspective view of the busbar frame and the end plate included in the battery module of FIG. 1.

Meanwhile, the battery module 100 according to the present embodiment may form a module-less structure in which the module frame and the end plate are removed, unlike the conventional battery module described with reference to FIGS. 1 to 3. Instead of the module frame, the battery module 100 according to the present embodiment may include a side surface plate 600 and a holding band 700. As the module frame and the end plate are removed, complicated processes that require precise control, such as the process of housing the battery cell stack 200 inside the module frame, or the process of assembling module frames and end plates, is not necessary. Further, there is an advantage in that the weight of the battery module 100 can be significantly reduced only by the removed module frame and end plate. Further, the battery module 100 according to the present embodiment has an advantage that re-workability is advantageous in the battery pack assembly process due to the removal of the module frame. In contrast, the conventional battery module 10 could not be reworked even if a defect occurs due to the welding structure of the module frame.

The side surface plate 600 is a plate-shaped member and can be disposed on both side surfaces of the battery cell stack 200 to supplement the rigidity of the battery module 100. Such side surface plate 600 has elastic properties and may include a plastic material manufactured by injection molding.

A holding band 700 is a member that wraps the battery cell stack 200 at both end parts of the battery cell stack 200, and can perform the function of fixing the plurality of battery cells 110 and the side surface plates 600 constituting the battery cell stack 200. After fixing the battery cell stack 200 and the side surface plate 600 via the holding band 700 in this way, an insulating cover 400 can be disposed on the front surface and rear surface of the battery cell stack 200 corresponding to the direction in which the electrode leads 111 and 112 protrude. Such a holding band 700 can be composed of a material having a predetermined elastic force, and specifically, may include a metal material or a composite material.

Next, an HV connection structure and an LV connection structure via the sensing assembly and the insulating cover according to the present embodiment will be described with reference to FIGS. 7 to 11 and the like.

Figure 7:
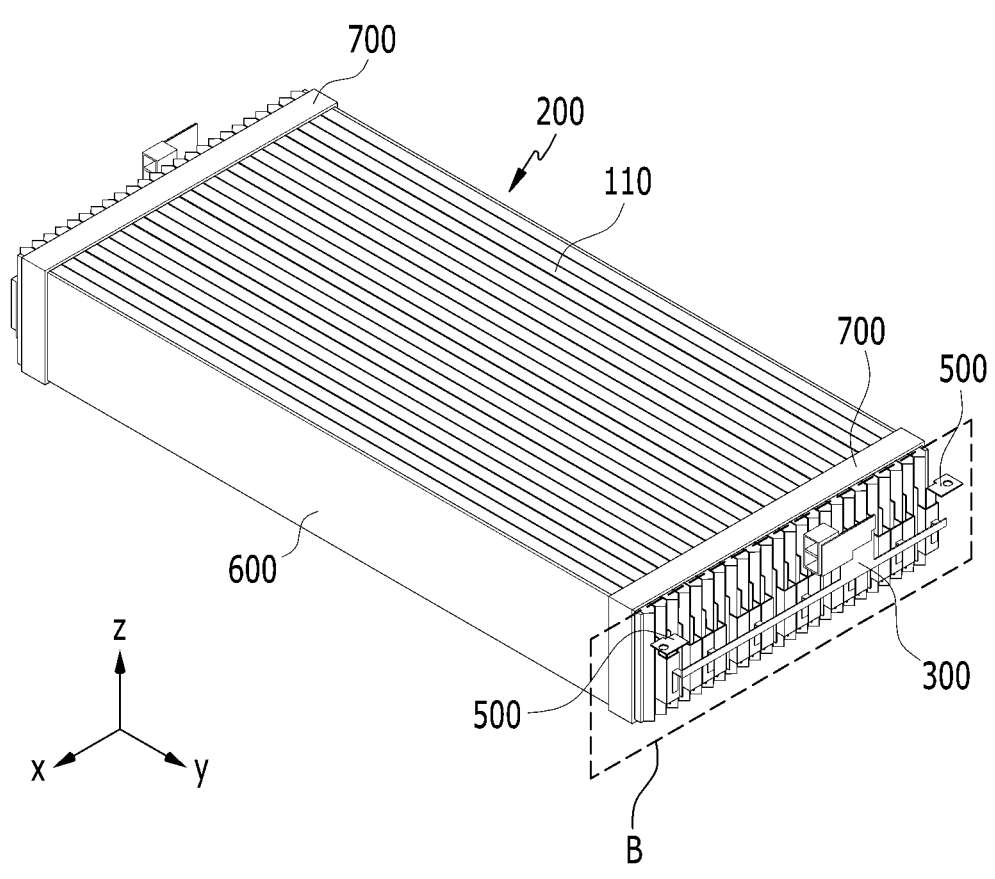
FIG. 7 is a perspective view showing a state in which an insulating cover is removed from the battery module of FIG. 4.
Figure 8:
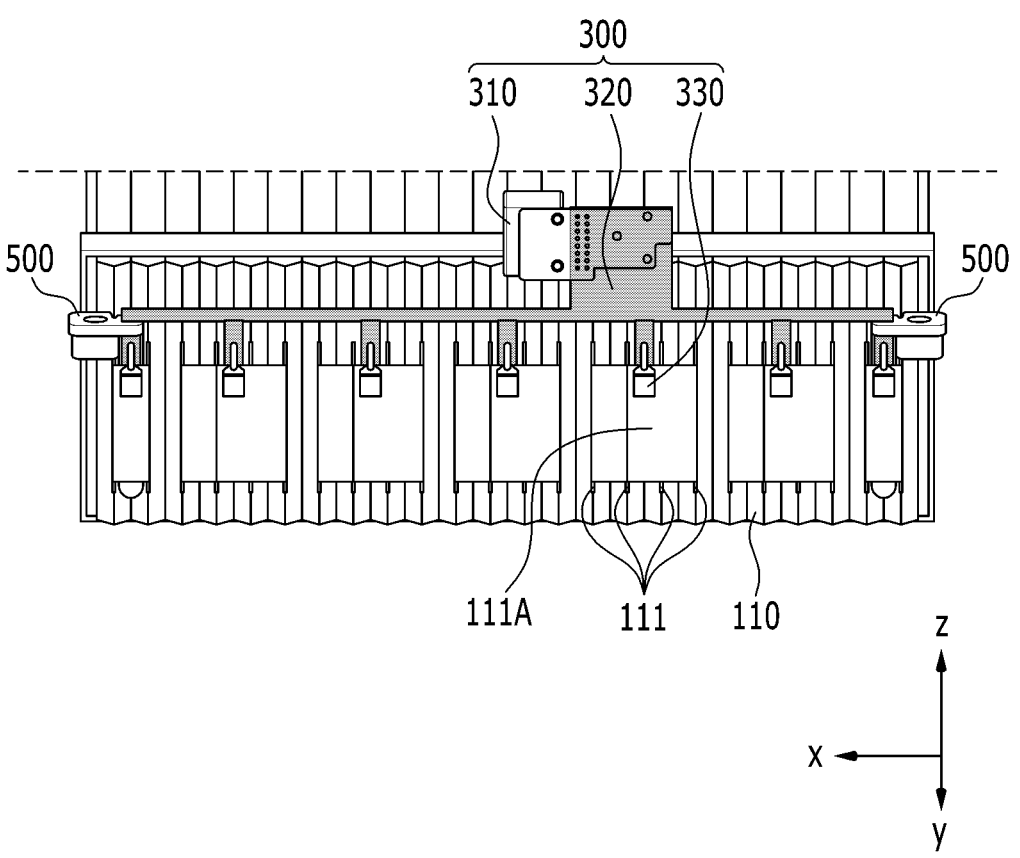
FIG. 8 is a partial view showing a section "B" of FIG. 7 in an enlarged manner.

FIG. 7 is a perspective view showing a state in which an insulating cover is removed from the battery module of FIG. 4. FIG. 8 is a partial view showing a section "B" of FIG. 7 in an enlarged manner.

Referring to FIGS. 5, 7 and 8, the battery module 100 according to the present embodiment includes a sensing assembly 300 for transmitting voltage information of the battery cells 110. The sensing assembly 300 is located at one end of a connector 310, a connection member 320 for connecting the connector 310 and the electrode lead 111, and a joining member 330 located at one end of the connection member 320 and joined to the electrode lead 111. The sensing assembly 300 and the connector 310 included therein according to the present embodiment may be an LV sensing assembly and an LV connector for LV (low voltage) connection, respectively.

Meanwhile, the sensing assembly 300 according to the present embodiment is mounted on the inside surface of the insulating cover 400, and is located between the battery cell stack 200 and the insulating cover 400. In FIGS. 7 and 8, for convenience of explanation, a state in which the insulating cover 400 is removed will be described. The mounting structure of the sensing assembly 300 and the insulating cover 400 will be described below with reference to FIGS. 9 to 11.

The connector 310 may be configured to transmit and receive signals to and from an external control device in order to control the plurality of battery cells 110. The connection member 320 may be a flexible printed circuit board (FPCB) or a flexible flat cable (FFC). It is possible to sense the voltage and temperature of the plurality of battery cells 110, and transmit electrical information to a BMS (battery management system) via the connector 310. That is, the sensing assembly 300 including the connector 310 and the connection member 320 can detect and control phenomena such as overvoltage, overcurrent, and overheating of each battery cell 110. The joining member 330 is located at one end of the connection member 320 and can be composed of a metal material having electrical conductivity. The joining member 330 is joined to the electrode lead 111, whereby the connection member 320 and the electrode lead 111 can be electrically and physically connected. Specifically, one side of the joining member 330 is coupled with the connection member 320 by being bent after passing through the connection member 320, and the other side of the joining member 330 may be formed in a plate shape and joined to the electrode lead 111, particularly, weld-joined.

On the other hand, as described above, the battery cells 110 may be stacked along the x-axis direction to form the battery cell stack 200, whereby the electrode leads 111 and 112 may protrude in the y-axis direction and the −y-axis direction, respectively. At this time, as shown in FIG. 8, at least two electrode leads 111 can be bent and joined to form an electrode lead joint body 110A. Specifically, the electrode leads 111 protruding in the same direction with respect to the adjacent battery cells 110 can be bent in a direction perpendicular to the protrusion direction of the electrode leads 111, and joined to each other to form the electrode lead joint body 111A. Thereby, one surface of the electrode lead joint body 111A may be perpendicular to a direction in which the electrode lead 111 protrudes from the battery cell 110. Meanwhile, it can be connected to at least one terminal busbar 500 among the electrode leads 111 of the battery cells 110 of the battery cell stack 200. Unlike the conventional battery module in which the electrode leads are connected to each other via a busbar, the electrode leads 111 according to the present embodiment are directly joined to each other, a part of which can be connected to the terminal busbar 500, thereby forming an HV connection. Therefore, in the HV connection structure according to the present embodiment, a busbar and a busbar frame to which the busbar is mounted can be removed.

Meanwhile, the joining member 330 of the sensing assembly 300 may be joined to the electrode lead joint body 111A, so that the sensing assembly 300 and the electrode lead 111 can be connected to each other. Specifically, the joining member 330 of the sensing assembly 300 can be joined directly to the one surface of the electrode lead joint body 111A. That is, unlike the conventional battery module in which the sensing assembly is mounted on the busbar frame, the sensing assembly 300 according to the present embodiment is connected directly to the electrode lead joint body 111A formed by the electrode lead 111, thereby forming an LV connection.

Figure 3:
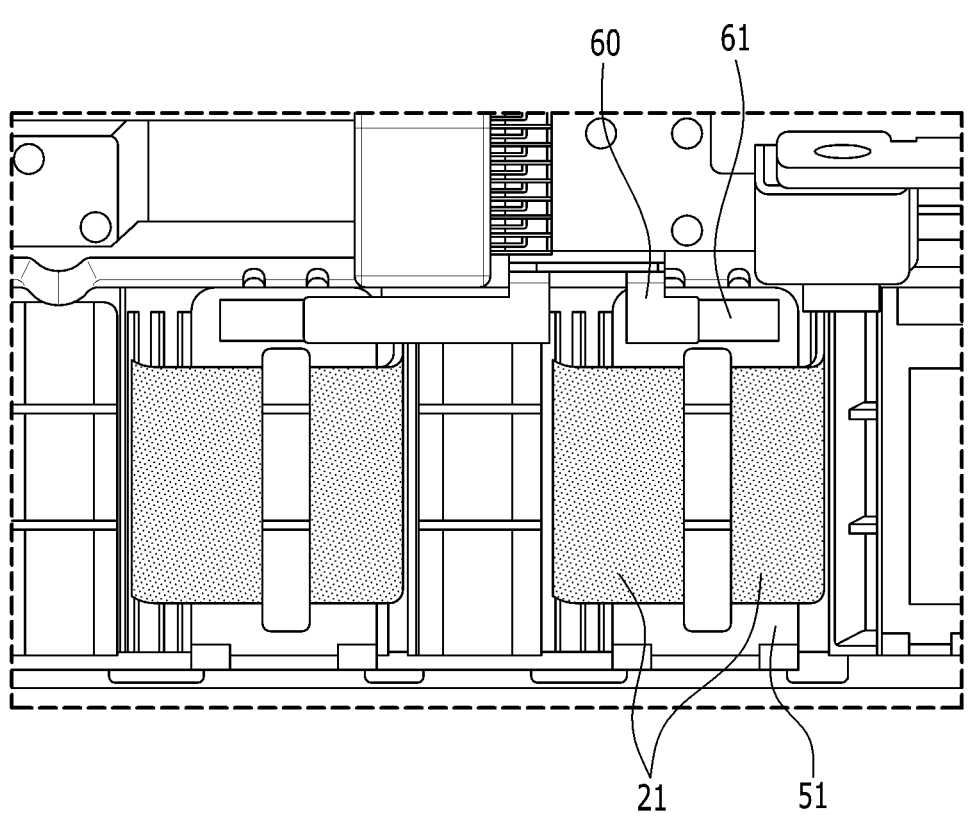
FIG. 3 is a partial view showing a section "A" of FIG. 2 in an enlarged manner.

In the case of the conventional battery module 10 shown in FIG. 3, the HV connection and the LV connection are separately performed, whereas in the battery module 100 according to the present embodiment, the HV connection and the LV connection can be simultaneously performed via an electrode lead joint body 111A and a sensing assembly 300 directly connected thereto, and as described above, the configuration of the busbar and the busbar frame is unnecessary. Since HV connection and LV connection are not performed separately, but can be performed at a time, the manufacturing process is simplified and the configuration of the busbar frame can be removed, which is advantageous in that it is possible to manufacture the battery module 100 having a more compact structure while reducing the weight of parts.

In the joining between the electrode leads 111 for forming the electrode lead joint body 111A, or in the joining between the electrode lead joint body 111A and the joining member 330, the joining method is not particularly limited if an electrical connection is possible, and as an example, weld-joining can be performed. Further, although the electrode leads 111 protruding in the y-axis direction were mainly described, the structure of the electrode lead joint body and the LV sensing assembly 300 can be formed similarly to the electrode leads 112 protruding in the −y-axis direction.

Next, a mounting structure of the sensing assembly and the insulating cover will be described in detail with reference to FIGS. 9 to 11.

Figure 9:
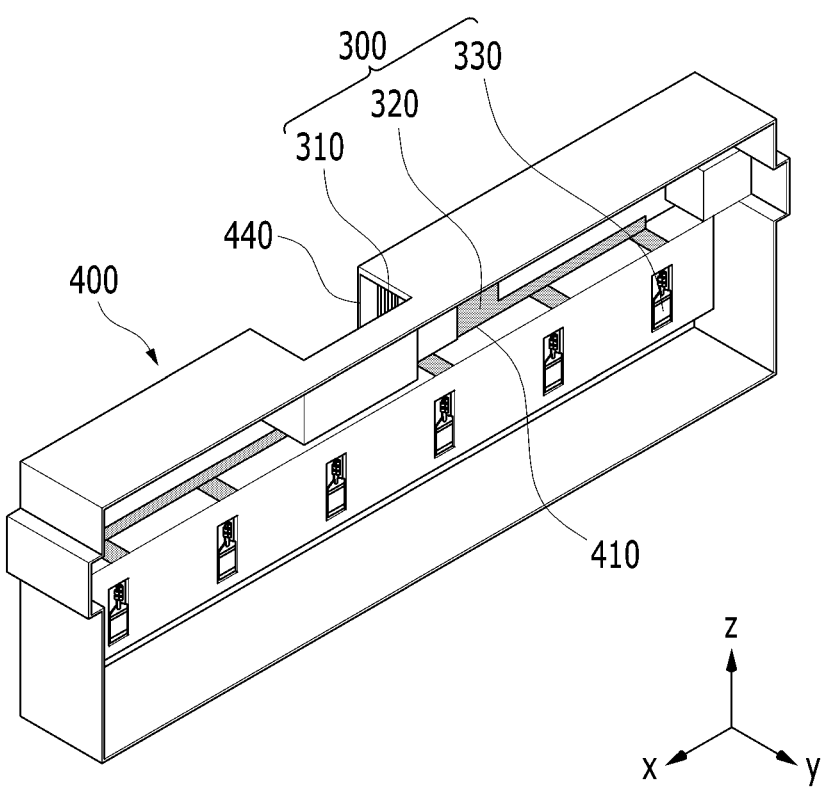
FIGS. 9 to 11 are views showing the insulating cover included in the battery module of FIG. 4 from various angles.
Figure 10:
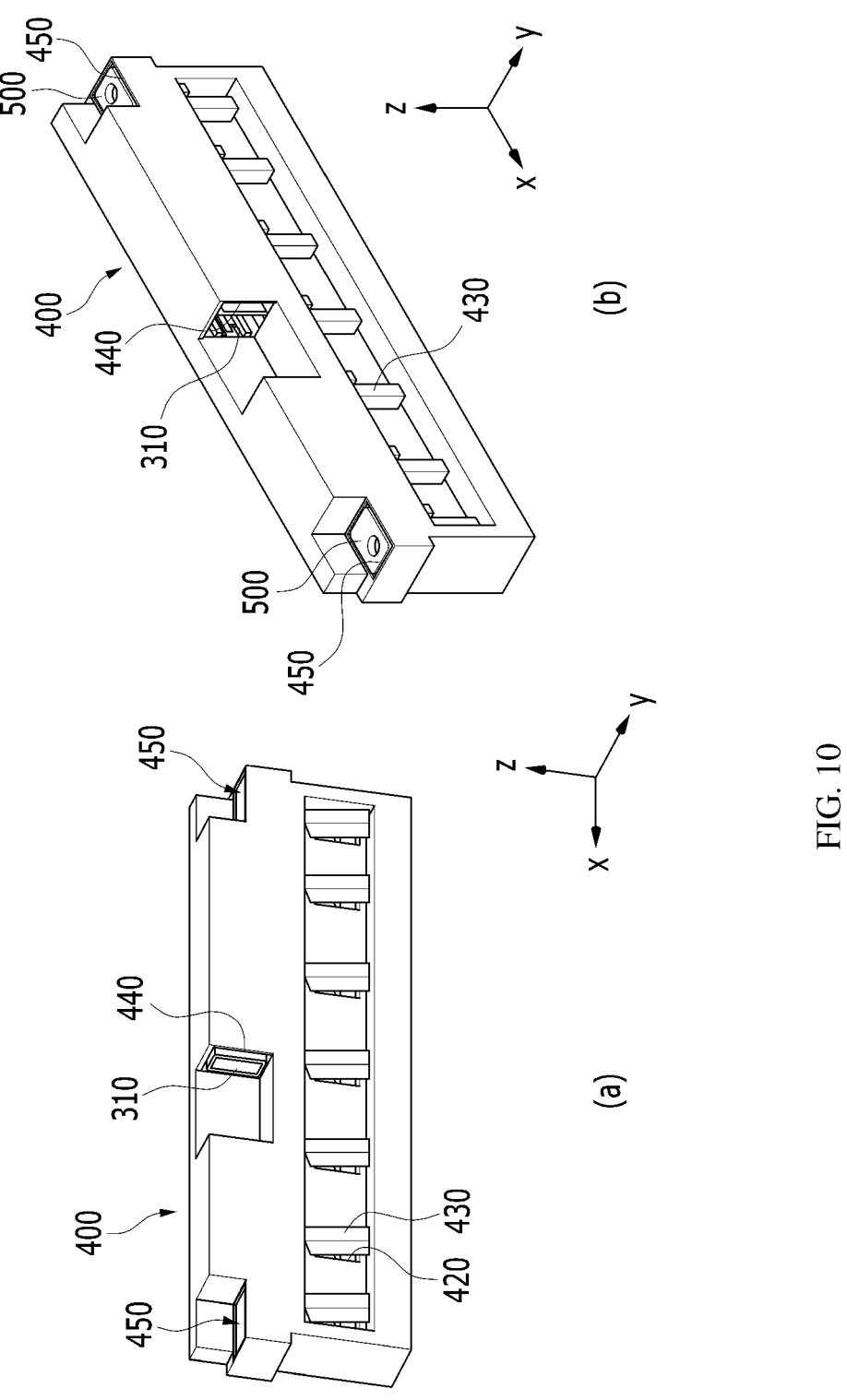
Figure 11:
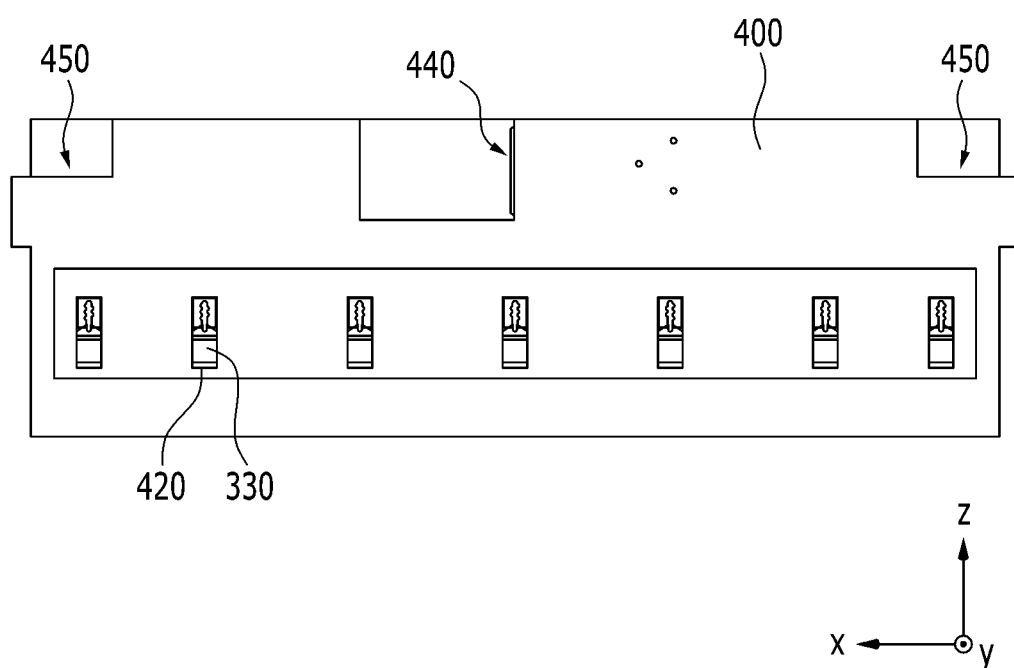

FIGS. 9 to 11 are views showing the insulating cover included in the battery module of FIG. 4 from various angles. Specifically, FIG. 9 is an enlarged view of the insulating cover 400 located along the −y-axis direction with respect to the battery cell stack 200 in FIG. 4, FIGS. 10a and 10b are enlarged views of the insulating cover 400 located along the y-axis direction with respect to the battery cell stack 200 in FIG. 4, and FIG. 11 is a plan view of the insulating cover of FIGS. 10a and 10b as viewed in the −y-axis direction on the xz plane.

First, referring to FIGS. 4 and 9, as described above, the battery module 100 according to the present embodiment includes an insulating cover 400 which covers the front surface and rear surface of the battery cell stack 200 in which the electrode leads 111 and 112 protrude. The front surface and rear surface of the battery cell stack 200 mean surfaces corresponding to the y-axis direction and the −y-axis direction with respect to the battery cell stack 200, respectively. Such an insulating cover 400 may include a material having electrical insulation. In one example, the insulating cover may include a plastic material, a polymer material, or a composite material. Further, it may be formed in a kind of basket shape so as to cover the front surface and rear surface of the battery cell stack 200. In FIGS. 7 and 8, for convenience of explanation of the sensing assembly 300, a state in which the insulating cover 400 is removed is shown, but according to the present embodiment, the sensing assembly 300 is connected to the electrode lead 111 while being mounted on the inside surface of the insulating cover 400. The inside surface of the insulating cover 400 may refer to a surface of the insulating cover 400 that faces the electrode lead 111, that is, the electrode lead joint body 111A. Furthermore, the inside surface of the insulating cover 400 may be formed with a mounting part 410 that is indented so as to mount the sensing assembly 300. Specifically, the mounting part 410 may have a structure that is indented into a shape corresponding to the sensing assembly 300. On the other hand, the sensing assembly 300 may be fixed to the inside surface of the insulating cover 400, and specifically, it may be fixed by a method such as bolts, heat fusion, bonding, or welding.

As described above, in the battery module 100 according to the present embodiment, the end plate and the busbar frame may be removed, and instead, the insulating cover 400 on which the sensing assembly 300 is mounted may be provided. While the insulating cover 400 covers the front surface and rear surface of the battery cell stack 200, the sensing assembly 300 mounted on the inside surface of the insulating cover 400 is connected to the electrode lead joint body 111A via the joining member 330, so that the LV connection structure described above can be formed. Ultimately, the insulating cover 400 according to the present embodiment integrates the functions of the end plate and the busbar frame, thereby simplifying the manufacturing process and reducing the weight of parts.

Next, referring to FIGS. 10*a*, 10*b* and 11, the insulating cover 400 may include an opening part 420, and the opening part 420 may be formed at a position corresponding to a section where the joining member 330 of the sensing assembly 300 is joined to the electrode lead 111. Therefore, as shown in FIG. 11, the joining member 330 located on the electrode lead joint body may be observed via the opening part 420. At this time, for convenience of explanation, the illustration of the cover part 430, which will be described later, is omitted in FIG. 11.

The insulating cover 400 in a state in which the sensing assembly 300 is mounted on the mounting part 410 is positioned on the front and rear surfaces of the battery cell stack 200, and then the joining between the joining member 330 and the electrode lead joint body 111A via the opening part 420 can be performed. For example, a welding device is inserted through the opening part 420, so that weld-joining between the joining member 330 and the electrode lead joint body 111A may be performed.

Further, the insulating cover 400 according to the present embodiment may include a cover part 430 forming an opening/closing structure with respect to the opening part 420. As shown in FIG. 10*a*, one edge of the cover part 430 may be connected to the insulating cover 400, and the remaining edges may be separated from the insulating cover 400 to form an opening/closing structure for the opening part 420. Therefore, when joining between the joining member 330 and the electrode lead joint body 111A, the cover part 430 is opened to form an open state, and in other circumstances, the cover part 430 can be closed to maintain a closed state.

Meanwhile, the insulating cover 400 according to the present embodiment may guide the external connection between the connector 310 and the terminal busbar 500 instead of the configuration of the end plate. Specifically, a connector opening part 440 for guiding the external connection of the connector 310, that is, the LV connection, may be formed in the insulating cover 400, and a terminal busbar opening part 450 for guiding an external connection of the terminal busbar 500, that is, an HV connection, may be formed. The insulating cover 400 may interrupt contact with an external conductive object at the time of LV connection and HV connection and secure insulation. In addition, in the HV connection process, bolts and nuts may be fastened via a through hole formed in the terminal busbar 500, and the insulating cover 400 and the terminal busbar opening part 450 formed thereon may function as a kind of guide through which the bolts and nuts are properly fastened.

Figure 12:
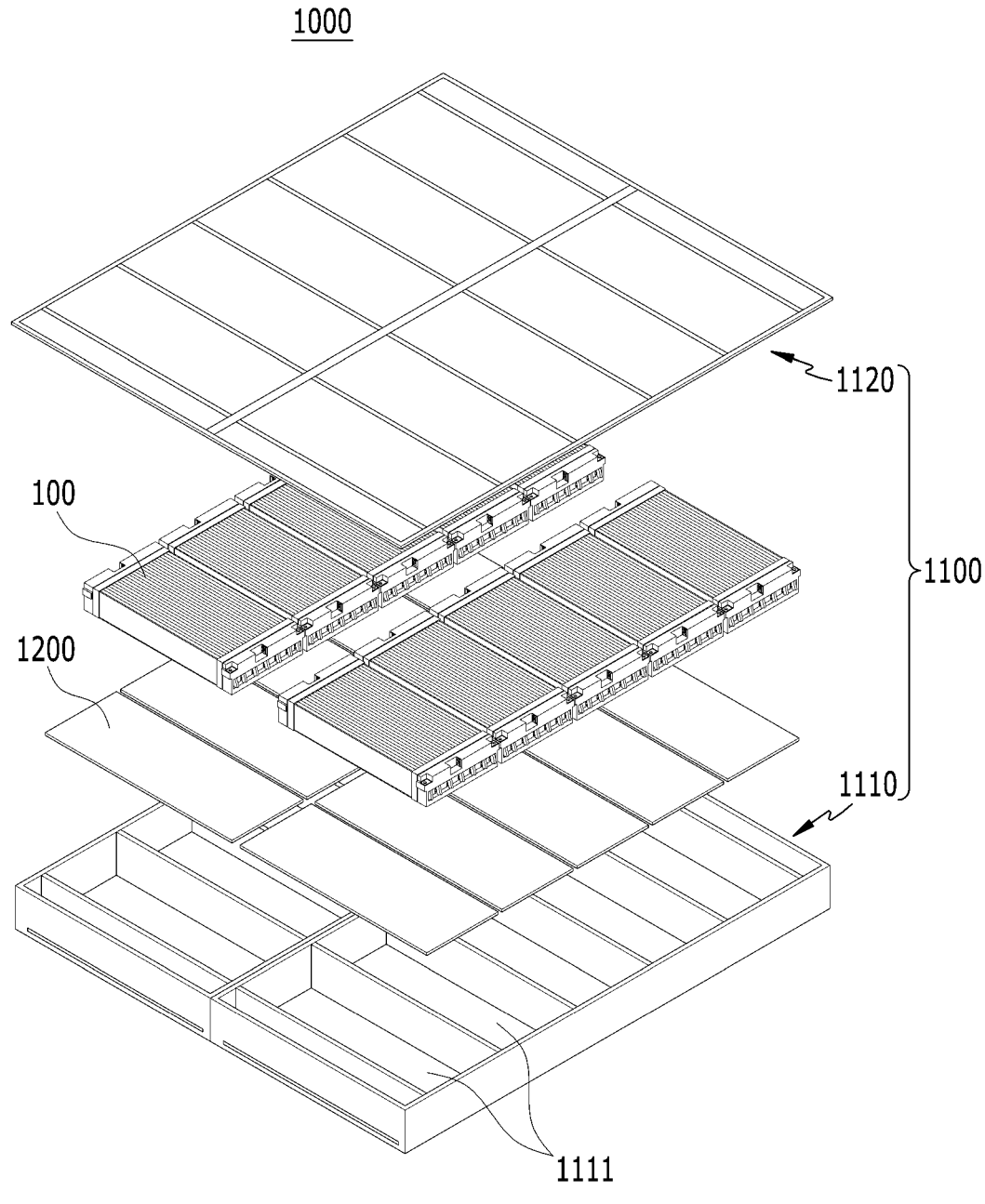
FIG. 12 is an exploded perspective view of a battery pack according to an embodiment of the present disclosure.

FIG. 12 is an exploded perspective view of a battery pack according to an embodiment of the present disclosure.

Referring to FIG. 12, a battery pack according to an embodiment of the present disclosure may include the battery module 100, a pack frame 1100 for housing the battery module 100, and a thermal conductive resin layer 1200 located between the battery module 100 and the bottom part 111 of the pack frame 1100.

First, the battery module 100 may include an insulating cover as described above, and instead may form a module-less structure in which the module frame and the end plate are removed. Such battery modules 100 may be gathered by a plurality of numbers and housed in the pack frame 1100 to form the battery pack 1000.

The pack frame 1100 may include a lower frame 1110 and an upper frame 1120 for covering the lower frame 1110, and a plurality of battery modules 100 may be located at the bottom part 1111 of the lower frame 1110.

Meanwhile, the thermal conductive resin layer 1200 may be formed by applying a thermal conductive resin to the bottom part 1111 of the lower frame 1110. The thermal conductive resin may include a thermal conductive adhesive material, and specifically, may include at least one of silicone material, urethane material, and acrylic material. The thermal conductive resin is a liquid during application but is cured after application, so that it can perform the role of fixing the battery module 100 to the lower pack housing 1110. Further, since the thermal conductive resin has excellent heat transfer properties, heat generated from the battery module 100 can be quickly transferred to the bottom part 1111, thereby preventing overheating of the battery pack 1000.

As shown in FIG. 4, in the battery module 100 according to the present embodiment, a part of the battery cell 110 may be exposed to the outside in the module-less structure in which the module frame is removed, and it is essential to fix the exposed battery cell 110 for structural stability. Therefore, the battery pack 1000 according to the present embodiment can form a heat conductive resin layer capable of fixing the battery module 100, particularly, each battery cell 110 constituting the battery module 100, to the bottom part 1111, thereby improving structural stability.

Figure 13:
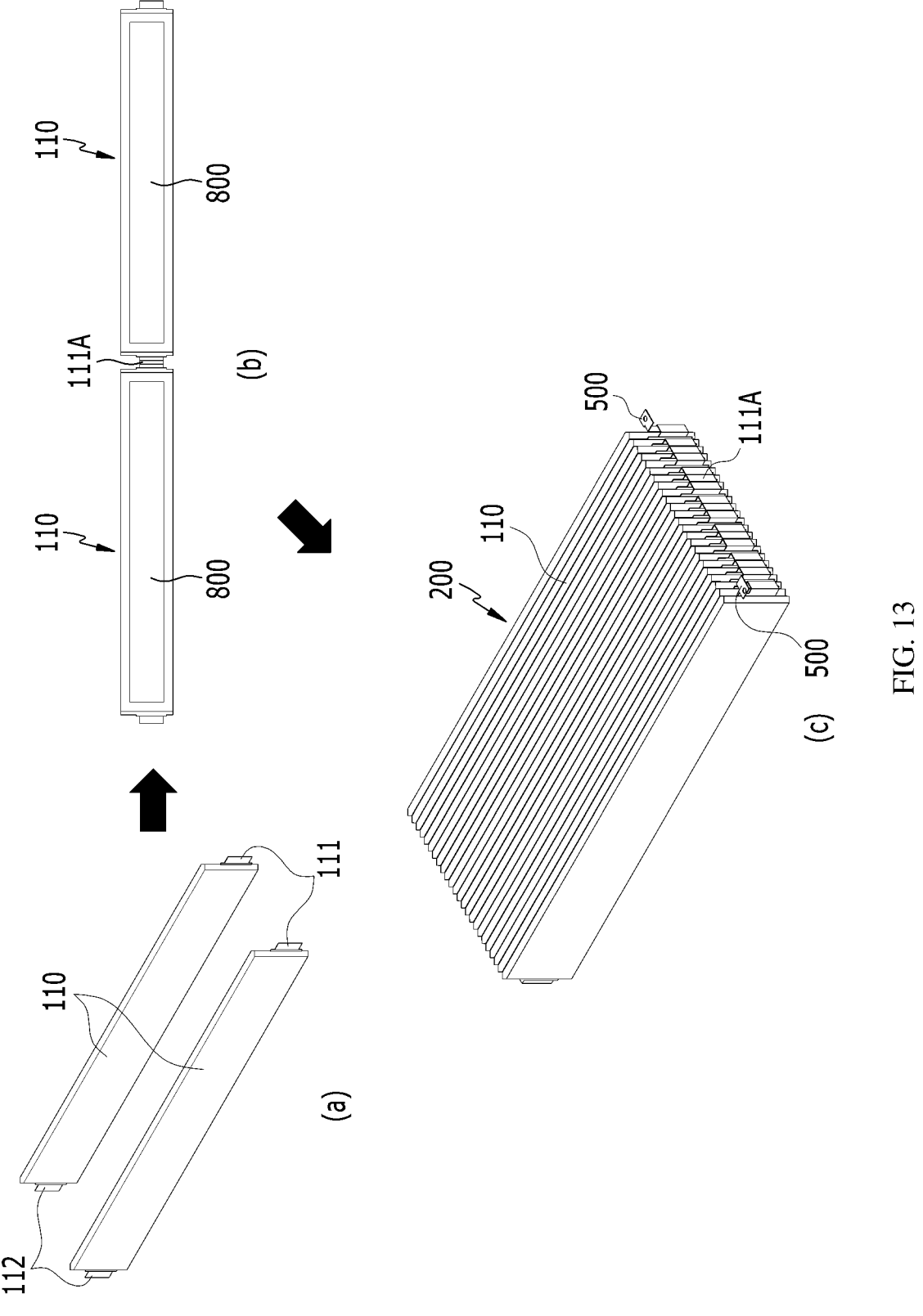
FIGS. 13*a* to 13*c* are views for explaining a method of manufacturing a battery cell stack according to an embodiment of the present disclosure.
Figure 14:
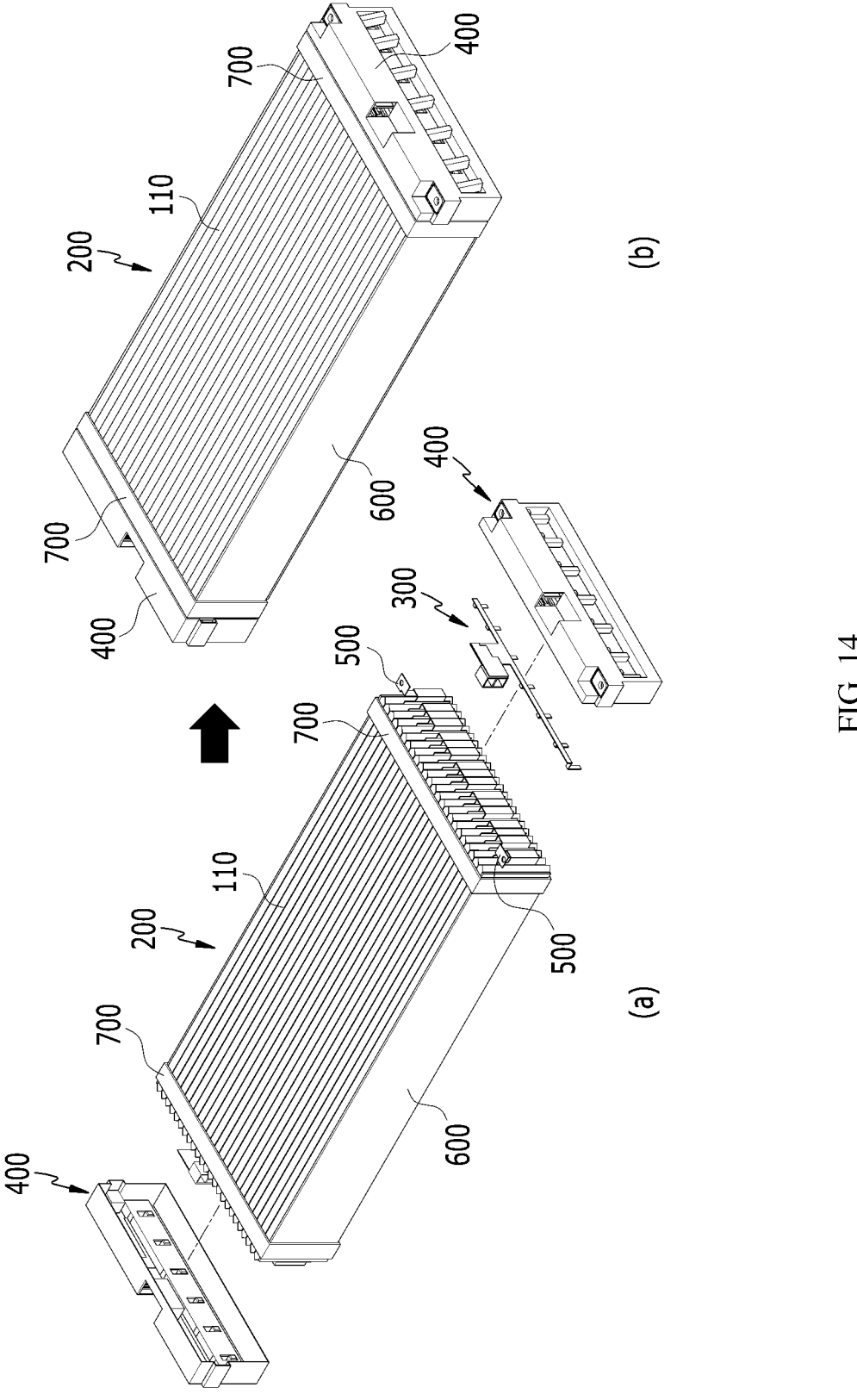
FIGS. 14*a* and 14*b* are views for explaining a method of manufacturing a battery module according to an embodiment of the present disclosure.

Next, a method of manufacturing a battery module according to an embodiment of the present disclosure will be described in detail with reference to FIGS. 13 and 14.

However, parts overlapping with the previously described parts will be omitted in order to avoid repetition of the description.

FIGS. 13*a* to 13*c* are views for explaining a method of manufacturing a battery cell stack according to an embodiment of the present disclosure. FIGS. 14*a* and 14*b* are views for explaining a method of manufacturing a battery module according to an embodiment of the present disclosure.

First, referring first to FIGS. 4 and 13*a* to 13*c*, the method of manufacturing a battery module according to an embodiment of the present disclosure includes a step of stacking a plurality of battery cells 110 to form a battery cell stack 200, and a step of joining electrode leads 111 and 112 protruding from at least two adjacent battery cells 110 among the battery cells 110 to form an electrode lead joint body 111A.

At this time, the step of forming the battery cell stack 200 and the step of forming the electrode lead joint body 111A can be performed at the same time. Specifically, in forming the battery cell stack 200 by stacking the pouch-type battery cells 110 in which the two electrode leads 111 and 112 protrude so as to face each other in one direction, a method, in which the electrode leads 111 and 112 of one battery cell 110 and the electrode leads 111 and 112 of the other battery cell 110 are joined to form an electrode lead joint body 111A, and the electrode leads 111 and 112 are bent, can be repeatedly performed. Further, the adhesive 800 may be applied between the adjacent battery cells in order to improve the fixing force between the adjacent battery cells 110. In other words, the step of forming the battery cell stack 200 according to the present embodiment may include a step of applying an adhesive between adjacent battery cells 110 to attach the adjacent battery cells 110 to each other, and a step of bending the electrode leads 111 and 112 of each of the adjacent battery cells 110 and joining them to each other.

Next, referring to FIGS. 4, 9, 10*a*, 14*a* and 14*b*, the manufacturing method of the battery module 100 according to the present embodiment may include locating the insulating cover 400 on which the sensing assembly 300 is mounted on the front surface and rear surface of the battery cell stack 200. The sensing assembly 300 includes a connector 310, a connection member 320 for connecting the connector 310 and the electrode lead joint body 111A, and a joining member 330 positioned at one end of the connection member 320. The detailed description of the above configuration will be omitted because it overlaps with the above-mentioned contents.

At this time, the sensing assembly 300 may be mounted on the inside surface of the insulating cover 400 so that the sensing assembly 300 may face the electrode lead assembly 111A in the step of locating the insulating cover. Specifically, the mounting part 410 is formed on the inside surface of the insulating cover 400 and the sensing assembly 300 can be mounted. The insulating cover 400 may be located so that the inside surface faces the electrode lead assembly 111A. Meanwhile, the insulating cover 400 is formed in a kind of basket shape and may be coupled to the battery cell stack 200 so as to cover the front surface and rear surface of the battery cell stack 200.

At this time, the insulating cover 400 may include the opening part 420, and the manufacturing method of the battery module 100 according to the present embodiment may further include a step of joining the joining member 330 and the electrode lead 111, in particular, the electrode lead assembly 111A through the opening part 420 formed in the insulating cover 400. For this purpose, the opening part 420 is preferably formed at a position corresponding to a section where the joining member 330 is joined to the electrode lead 111. In addition, the insulating cover 400 may further include a cover part 430 for forming an opening/closing structure with respect to the opening part 420. After the joining member 330 and the electrode lead assembly 111A are joined, the cover part 430 can be closed to maintain a closed state.

On the other hand, before the step of locating the insulating cover, the step of disposing the plate-shaped side plates 600 on both side surfaces of the battery cell stack 200 in order to supplement the rigidity of the battery module 100 may be performed.

Further, before the step of locating the insulating cover, a step of wrapping the upper surface, the lower surface and both side surfaces of the battery cell stack 200 with the holding band 700 may be performed. At this time, the holding band 700 may wrap not only the battery cell stack 200 but also the side plates 600 disposed on both side surfaces thereof. The battery cells 110 and the side plate 600 included in the battery cell stack 200 is fixed via the holding band 700, so that the insulating cover 400 can be easily coupled to the front surface and rear surface of the battery cell stack 200.

Even though the terms indicating directions such as upper, lower, left, right, front and rear directions are used herein, it is obvious to those skilled in the art that these merely represent relative positions for convenience in explanation and may vary depending on a position of an observer, a position of an object, or the like.

The one or more battery modules according to the present embodiment as described above can be mounted together with various control and protection systems such as a battery management system (BMS) and a cooling system to form a battery pack.

The battery module or the battery pack can be applied to various devices. Specifically, these devices can be applied to vehicle means such as an electric bicycle, an electric vehicle, a hybrid vehicle, but the present disclosure is not limited thereto and can be applied to various devices that can use the secondary battery.

Although the preferred embodiments of the present disclosure have been described in detail above, the scope of the present disclosure is not limited thereto, and various modifications and improvements made by those skilled in the art using the basic concepts of the present disclosure defined in the following claims also falls within the spirit and scope of the present disclosure.

DESCRIPTION OF REFERENCE NUMERALS

100: battery module
111A: electrode lead joint body
200: battery cell stack
300: sensing assembly
400: insulating cover

The invention claimed is:

1. A battery module comprising:
a battery cell stack in which a plurality of battery cells including electrode leads are stacked;
an insulating cover that covers a first surface and a second surface of the battery cell stack from which the electrode leads protrude; and
a sensing assembly disposed between the battery cell stack and the insulating cover, the sensing assembly comprising a connector and a connection member for connecting the connector and the electrode leads, the sensing assembly further comprising a joining member disposed at a first end of the connection member and directly coupled to the electrode leads, wherein the connector is configured to transmit and receive signals to and from an external control device, wherein the connection member is a flexible printed circuit board or a flexible flat cable, spaced from the electrode leads and coupled to the electrode leads by the joining member, wherein the joining member comprises a metal material having electrical conductivity, and wherein the sensing assembly is mounted on an inside surface of the insulating cover facing the electrode leads.

2. The battery module according to claim 1, wherein:

the inside surface of the insulating cover faces the electrode leads, and is formed with a mounting part that is indented so as to couple the sensing assembly thereto.

3. The battery module according to claim 1, wherein:

the insulating cover comprises at least one opening part, and the opening part is formed at a position corresponding to a section where the joining member is coupled to the electrode leads.

4. The battery module according to claim 3, wherein:

the insulating cover comprises a cover part for covering the opening part, and the cover part forms an opening/closing structure configured to transition between an open state and a closed state.

5. The battery module according to claim 1, wherein:

a connector opening part for guiding an external connection of the connector is formed in the insulating cover.

6. The battery module according to claim 1, further comprising:

a terminal busbar connected to at least one of the electrode leads, wherein a terminal busbar opening part for guiding an external connection of the terminal busbar is formed in the insulating cover.

7. The battery module according to claim 1, wherein:

at least two of the electrode leads are bent and joined to form an electrode lead joint body, and the sensing assembly is coupled to the electrode lead joint body.

8. A battery pack comprising:

the battery module as set forth in claim 1;

a pack frame for housing the battery module; and a thermal conductive resin layer disposed between the battery module and the pack frame.

9. A method of manufacturing a battery module, comprising the steps of:

stacking a plurality of battery cells to form a battery cell stack;

joining electrode leads protruding from at least two adjacent battery cells to form an electrode lead joint body; and coupling an insulating cover on a first surface and a second surface opposing the first surface of the battery cell stack, wherein a sensing assembly is mounted on an inside surface of the insulating cover, and the sensing assembly faces the electrode lead joint body in the step of coupling the insulating cover, wherein the sensing assembly comprises a connector, a connection member for connecting the connector and the electrode leads, and a joining member located at one end of the connection member, wherein the connector is configured to transmit and receive signals to and from an external control device, wherein the connection member is a flexible printed circuit board or a flexible flat cable, spaced from the electrode leads and coupled to the electrode leads by the joining member, wherein the joining member comprises a metal material having electrical conductivity, and the method further comprises directly joining the joining member and the electrode leads.

10. The method of manufacturing a battery module according to claim 9, wherein:

the joining member and the electrode lead are joined via an opening part formed in the insulating cover.

11. The method of manufacturing a battery module according to claim 10, wherein:

the insulating cover comprises a cover part that forms an opening/closing structure configured to transition between an open state and a closed state.

12. The method of manufacturing a battery module according to claim 9, wherein:

the step of forming a battery cell stack comprises, applying an adhesive between adjacent battery cells to couple the adjacent battery cells to each other; and bending the electrode leads of each of the adjacent battery cells and coupling the electrode leads to each other.

13. The method of manufacturing a battery module according to claim 9, wherein:

before the step of coupling an insulating cover, wrapping surfaces of the battery cell stack with a holding band.

* * * * *